United States Patent
Wiederin et al.

(10) Patent No.: US 7,069,446 B2
(45) Date of Patent: Jun. 27, 2006

(54) STATELESS MECHANISM FOR DATA RETRIEVAL

(75) Inventors: Shawn E. Wiederin, Cedar Rapids, IA (US); Richard G. Moore, Cedar Rapids, IA (US); Duraisamy Gunasekar, Cedar Rapids, IA (US); Gregory Mumford, Marion, IA (US); Lonnie S. Clabaugh, San Pedro, CA (US); Jon Abel, Cedar Rapids, IA (US); Kolin G. Hogue, Kalona, IA (US)

(73) Assignee: MCI, LLC, Basking Ridge, NJ (US)

( * ) Notice: Subject to any disclaimer, the term of this patent is extended or adjusted under 35 U.S.C. 154(b) by 1008 days.

(21) Appl. No.: 09/836,146

(22) Filed: Apr. 17, 2001

(65) Prior Publication Data

US 2002/0007455 A1   Jan. 17, 2002

Related U.S. Application Data

(60) Provisional application No. 60/198,480, filed on Apr. 17, 2000.

(51) Int. Cl.
   *H04L 9/32*   (2006.01)
(52) U.S. Cl. .......................... 713/189; 713/193; 726/2; 726/3
(58) Field of Classification Search ................ 713/150, 713/160–161, 166–167, 170, 189, 193, 200–202; 705/50, 70; 709/200, 217, 219; 726/2–4, 726/7, 26–27; 707/1, 9, 10
   See application file for complete search history.

(56) References Cited

U.S. PATENT DOCUMENTS

| | | |
|---|---|---|
| 5,003,584 A | 3/1991 | Benyacar et al. |
| 5,204,894 A | 4/1993 | Darden |
| 5,386,464 A | 1/1995 | Pruitt |
| 5,483,586 A | 1/1996 | Sussman |
| 5,740,231 A | 4/1998 | Cohn et al. |
| 5,778,059 A | 7/1998 | Loghmani et al. |
| 5,787,304 A | 7/1998 | Hodges et al. |
| 5,903,874 A | 5/1999 | Leonard et al. |
| 5,907,603 A | 5/1999 | Gallagher et al. |
| 5,912,954 A | 6/1999 | Whited et al. |
| 5,940,487 A | 8/1999 | Bunch et al. |
| 5,943,611 A | 8/1999 | Moelne |
| 5,960,442 A | 9/1999 | Pickering |
| 6,000,031 A | 12/1999 | Bingaman et al. |
| 6,020,916 A | 2/2000 | Gerszberg et al. |

(Continued)

FOREIGN PATENT DOCUMENTS

EP   0 633 683   1/1995

(Continued)

OTHER PUBLICATIONS www.searchnetworking.techtarget.com; Printed from Google Sep. 20, 2004.

(Continued)

*Primary Examiner*—Hosuk Song (57) ABSTRACT

An approach for providing retrieval of information over a packet switched network is disclosed. A client is configured to transmit a request message for information over the packet switched network. A stateless-server is configured to communicate with the client and to forward a portion of the information to the client in response to the request message, wherein the client transmits a selection message specifying whether the remaining portion of the information should be retrieved from the server. The server selectively forwards the remaining portion of the information to the client. The above approach has particular applicability to a communication system providing directory assistance services.

38 Claims, 6 Drawing Sheets

U.S. PATENT DOCUMENTS

| | | | |
|---|---|---|---|
| 6,052,439 A | 4/2000 | Gerszberg et al. | |
| 6,212,506 B1 | 4/2001 | Shah et al. | |
| 6,240,518 B1 * | 5/2001 | Ooki et al. | 713/201 |
| 6,456,709 B1 | 9/2002 | Cox et al. | |
| 6,658,455 B1 | 12/2003 | Weinman | |
| 6,744,891 B1 * | 6/2004 | Allen | 380/231 |
| 6,771,597 B1 * | 8/2004 | Makansi et al. | 370/230 |
| 2002/0115431 A1 | 8/2002 | Cox et al. | |

FOREIGN PATENT DOCUMENTS

| | | |
|---|---|---|
| EP | 0 781 026 | 6/1997 |
| EP | 0 782 315 | 7/1997 |
| EP | 0 876 042 | 11/1998 |
| EP | 0 926 875 | 6/1999 |
| WO | 96/34341 | 10/1996 |
| WO | 98/35481 | 8/1998 |
| WO | 99/05845 | 2/1999 |
| WO | 99/55058 | 10/1999 |
| WO | 00/39987 | 7/2000 |

OTHER PUBLICATIONS http://www.infospace.com/.
http://www.qwestdex.com/.
http://www.555-1212.com/.
http://wwcn.whowhere.lycos.com/.

* cited by examiner

STATELESS MECHANISM FOR DATA RETRIEVAL

CROSS-REFERENCES TO RELATED APPLICATIONS

This application is related to, and claims the benefit of the earlier filing date of U.S. Provisional Patent Application (Ser. No. 60/198,480), filed Apr. 17, 2000, entitled "Ultimate Directory Assistance Suite," the entirety of which is incorporated herein by reference.

BACKGROUND OF THE INVENTION

1. Field of the Invention

The present invention relates to information systems, and is more particularly related to data processing over a packet switched network.

2. Discussion of the Background

Directory assistance services provide a viable source of revenue for telecommunication service providers and has proven to be an efficient mechanism for a customer to obtain information about a party whom the customer seeks to contact. Directory information is maintained by data providers (e.g., local exchange carriers (LECs), and Regional Bell Operating Companies (RBOCs), who provide directory "listings" to the telecommunication service providers for a fee. These data providers, as third parties to the service provider, typically require compensation when a listing is used. The conventional voice access directory assistance (i.e., "411" call) provides automated prompts to the customer to obtain the listing that the customer is seeking. This conventional system also employs a live operator to ensure that the customer is given the proper listing. For example, a typical scenario involves a customer dialing "411" on a telephone station and being prompted to state the name of the party that the customer seeks to contact as well as the city that the party resides. If there exists multiple listings, the live operator may intervene to gather more detailed information so that the correct and intended listing is provided. The live operator may, for instance, ask the customer to provide address information to determine which one of the multiple listings the customer seeks to obtain; thereafter, a proper determination of the desired listing can be made by the live operator. In this manner, only the actual listing that the customer utilizes translates into a charge for the customer; that is, the customer is not charged for multiple listings. For the purpose of usage tracking, standard call detail records can be employed to track charges. Additionally, such a directory assistance system ensures accuracy of the listing through the intervention of a live operator. For the service provider, the greater time that is spent servicing a particular customer through operator intervention, the greater the loss of potential revenue, in terms of opportunity cost.

Given the popularity of the World Wide Web—for that matter, the Internet in general—on-line directory services have emerged to provide an analogous service to that of the telephony based directory service. Many directory services that are provided on-line are provided as a free service, resulting in a lost of revenue to the service provider. In the implementations in which the service provider charges for use of the directory listings, there exists no mechanism to determine which listings are used by the customers. Consequently, the service provider has to compensate for all the directory listings, irrespective of use, resulting in overcompensation of the data providers. This approach results in an unnecessarily high cost to the service provider, and thus, the customers. Also, inaccurate tracking can result in potential fraud, as the customer is in a position to easily deny retrieval of the listings.

Further, currently on-line directory services lack comprehensive information about a particular party. With the information explosion, individuals in today's modem society can be reached via many other means than the conventional land-line telephone directory number. For example, these individuals possess numerous contact information, such as e-mail addresses, URLs (Uniform Resource Locator) information (i.e., web site), cellular telephone number, facsimile number, pager number, post office addresses, etc. Such comprehensive information is expensive to maintain, particularly, if the service provider cannot adequately track usage of the information; the cost of subscribing to the database of the data provider would be cost prohibitive for the service provider. Moreover, data integrity poses a challenge as such contact information necessitates continual updating.

In one conventional client-server approach to supporting on-line directory services, state information is maintained on the servers. The server that receives a directory request from a client needs to maintain information regarding the request (i.e., state information). Under this scenario, because the server stores state information pertaining to a particular request, this specific server must continue to service the requesting client. Essentially, this conventional approach mandates that the requesting client return to the specific server, as some state information is required for billing, for example. The drawbacks with this technique involve issues of availability and load balancing. Because a client request is tied to a particular server, the availability is negatively impacted in that if the specific server is down, then no other server may process the client request. Therefore, system availability is reduced. With respect to load balancing, the traffic associated with the client requests cannot be readily directed, thereby hindering system performance. Another related approach to supporting on-line directory services uses a global state mechanism shared by all servers (such as a logically central database). The main drawback of this technique is the additional complexity in the system needed to support the shared state mechanism. If not designed carefully, the shared state mechanism may also fail to meet availability and performance requirements.

Based on the foregoing, there is a clear need for improved approaches for providing directory services on-line. There is also a need to accurately track use of the directory listings. In addition, there is a need to provide directory services to customers cost-effectively. There is also a need to minimize development and implementation costs. There is still a further need to improve system availability and system performance. Therefore, an approach for providing retrieval of information which can be tracked and maintained cost-effectively is highly desirable.

SUMMARY OF THE INVENTION

The present invention addresses the above stated needs by providing a communication system that is capable of providing directory assistance services. The solution provides a process whereby a customer using a client station (possibly with web-browsing capability) determines which listing among multiple listings the customer wants to view, and therefore, selects the appropriate listing. The listing includes data that is hidden, visible, and encrypted data; the visible data provides sufficient guidance for the customer to properly select the desired listing. The hidden data may be represented by a character or a series of characters as place markers when it is presented to the customer. However, upon selection, hidden information is made visible, and the encrypted data is decrypted. The service provider tracks the listing that is uploaded (i.e., accessed and viewed). The client station supplies a server with state information that can be used to generate billing information and reports.

According to one aspect of the invention, a method for retrieving information over a packet switched network is disclosed. The method includes receiving a request message from a client for information. The method also includes forwarding a portion of the information to the client in response to the request message. Further, the method includes receiving a selection message specifying whether the remaining portion of the information should be retrieved, and selectively forwarding the remaining portion of the information to the client. The above arrangement advantageously provides accurate usage tracking of the desired information.

According to another aspect of the invention, a server for providing information over a packet switched network is disclosed. The server includes a communication interface that is configured to receive a request message from a client for information. The server also includes a processor coupled to the communication interface and configured to retrieve a portion of the information from a database in response to the request message. The communication interface receives a selection message from a client. The selection message specifies whether a remaining portion of the information should be retrieved, wherein the remaining portion of the information is selectively forwarded to the client. This arrangement advantageously provides a cost-effective mechanism for obtaining directory listings.

According to another aspect of the invention, a server for providing information over a packet switched network is disclosed. The server includes means for receiving a request message from a client for information, and means for forwarding a portion of the information to the client in response to the request message. The server also includes means for receiving a selection message specifying whether the remaining portion of the information should be retrieved, and means for selectively forwarding the remaining portion of the information to the client. This arrangement advantageously minimizes fraud, in that accurate tracking of the actual listings that are retrieved can be performed.

According to one aspect of the invention, a communication system includes a client configured to transmit a request message for information over a packet switched network. The system also includes a server that is configured to communicate with the client and to forward a portion of the information to the client in response to the request message, wherein the client transmits a selection message specifying whether the remaining portion of the information should be retrieved to the server. The server selectively forwards the remaining portion of the information to the client. Under this approach, a customer may obtain directory assistance cost-effectively.

In another aspect of the invention, a computer-readable medium carrying one or more sequences of one or more instructions for retrieving information over a packet switched network is disclosed. The one or more sequences of one or more instructions include instructions which, when executed by one or more processors, cause the one or more processors to perform the steps of receiving a request message from a client for information, and forwarding a portion of the information to the client in response to the request message. Other steps include receiving a selection message specifying whether the remaining portion of the information should be retrieved, and selectively forwarding the remaining portion of the information to the client. This approach advantageously permits accurate accounting and billing for directory assistance services.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to directory assistance services over the Internet and intranets, it is recognized that the information retrieval mechanism may be used for any type of information over any packet switched network.

Figure 1:
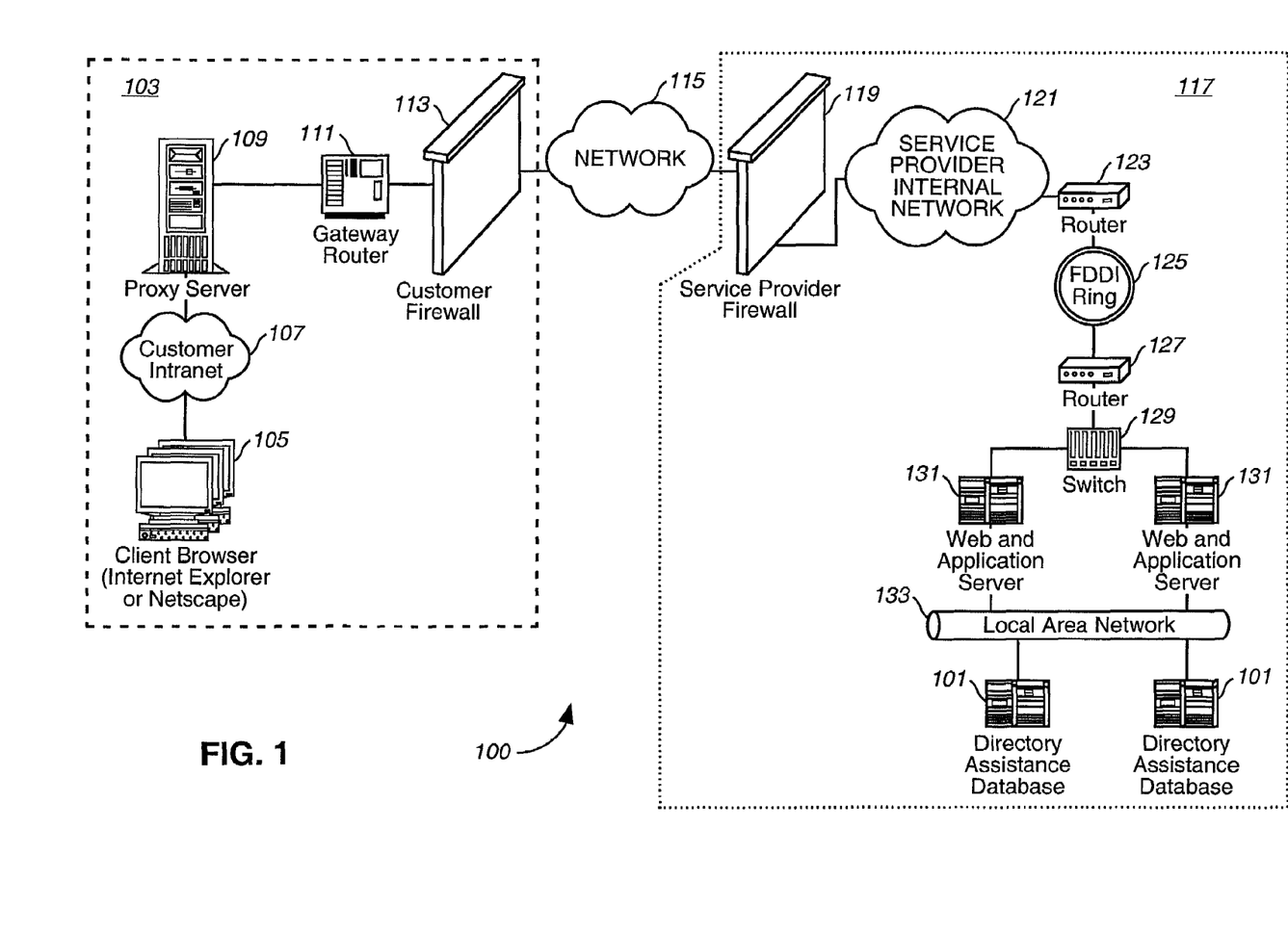
FIG. 1 is a diagram of the architecture of a communications system capable of providing directory assistance services, in accordance with an embodiment of the present invention.

FIG. 1 is a diagram of the architecture of a communications system capable of providing directory assistance services, in accordance with an embodiment of the present invention. Communication system 100 provides web-based access to a directory assistance database 101 of a service provider. It should be noted that the directory assistance database 101 is shown as multiple physical databases; however, it is recognized that a single physical database may be employed. In this exemplary embodiment, a customer, such as a corporate entity, may retrieve directory listings stored within the directory assistance database 101 through the customer's network 103, which includes client stations 105 that connect to a corporate intranet 107. The client stations 105 are configured with web-browsers, supporting the Hypertext Transfer Protocol (HTTP). Hypertext Transfer Protocol (HTTP) is an application-level protocol for distributed, collaborative, hypermedia information systems and is more fully described in the Internet Engineering Task Force (IETF) RFC 2616, which is incorporated herein by reference in its entirety. To communicate externally, the customer network 103 utilizes a proxy server 109 that communicates to a gateway router 111. Additionally, a firewall 113 provides security for the customer network 103 for the connection to an external network 115; although the firewall 113 is shown as a separate component, the firewall 113 may be alternatively be provided by the gateway router 111.

The external network 115 may be provided by a carrier to establish connectivity between the customer network 103 and the network 117 of the service provider. The external network 115 may be implemented according to any number of technologies, including but not limited to the Internet, Asynchronous Transfer Mode (ATM), and frame relay; additionally, the network 115 may be a circuit switched network (e.g., T1, T3, etc.). As seen in FIG. 1, the network 117 similarly employs a firewall 119 to prevent network intrusion from a source outside of network 117. An internal network 121 attaches to a router 123, which in turn connects to a Fiber Distributed Data Interface (FDDI) ring network 125; it is recognized by one of ordinary skill in the art that any high-speed network may be utilized.

The FDDI ring network 125 provides a high-speed transport mechanism between router 123 and another router 127, which in turn connects to a switch 129. The switch 129 processes traffic from web and application servers 131. A local area network 133, such as an Ethernet network, permits the web and application servers 131 to communicate with the directory assistance databases 101.

Figure 4:
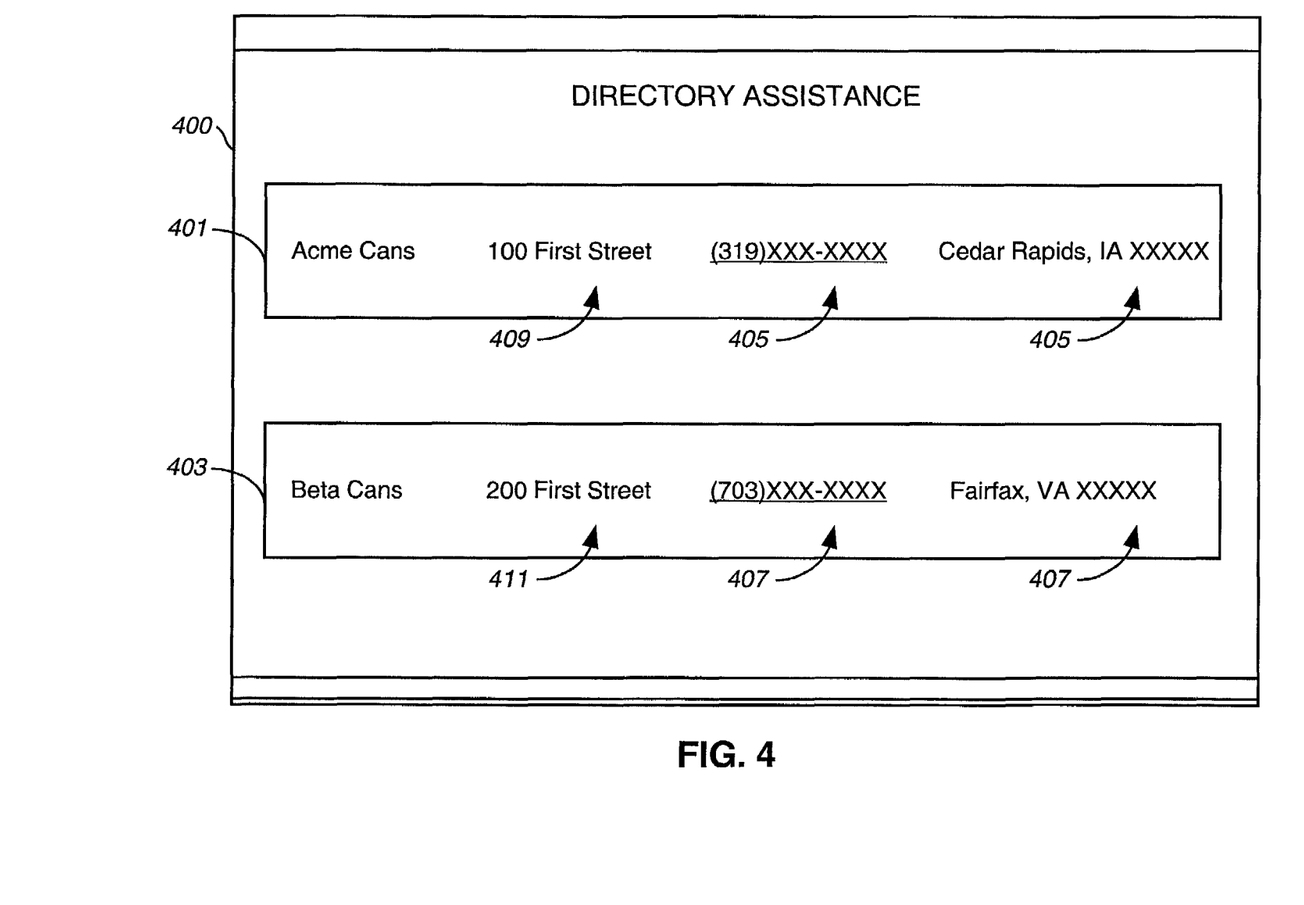
FIG. 4 is a diagram of a data selection screen of a graphical user interface (GUI) used in the system of FIG. 1, in accordance with an embodiment of the present invention.
Figure 5:
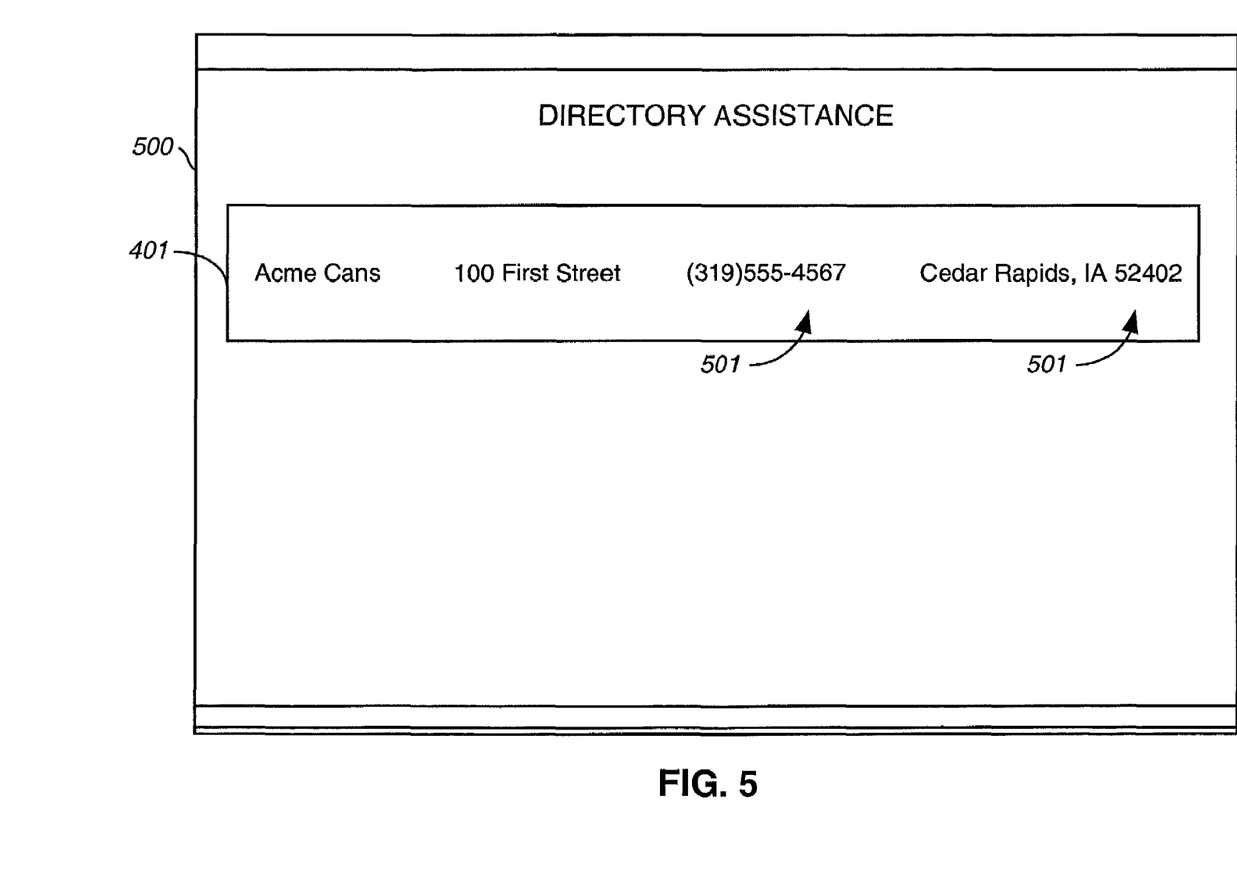
FIG. 5 is a diagram of a data display screen of the graphical user interface (GUI) of FIG. 4, in accordance with an embodiment of the present invention.

The system 100 allows business customers, for example, to access residential, business or government phone listings electronically from their corporate intranets 107. Alternatively, the customer may employ other mechanisms to access directory information that are stored in the directory assistance databases 101; these other access mechanisms may include e-mail clients, personal digital assistants (PDAs), and web-enabled cell phones. In this exemplary embodiment, the customer utilizes a client browser 105 to submit a request (or information query) to a web and application server 131, which returns a result based upon the information that is stored within the directory assistance databases 101. According to one embodiment of the present invention, the client browser 105 supplies all relevant information (i.e., state information) to the server 131 during each request, such that the server 131 need not maintain any state information related to the client. In an exemplary embodiment, HyperText Transfer Protocol (HTTP) cookies may be used as the mechanism to send state information from the server to the client. HTTP cookies are detailed in IETF (Internet Engineering Task Force) RFC (Request for Comment) 2109, entitled "HTTP State Management Mechanism", which is incorporated herein by reference in its entirety. Because the use of cookies is largely standardized, this mechanism for sending state information is readily deployable. The stateless mechanism of the server 131 advantageously improves system availability and load balancing over the conventional client-server approaches. The graphical user interface (GUI) associated with the client browsers 105 is shown in FIGS. 4 and 5.

The directory assistance database 101 may store information that is acquired from local exchange carriers (LECs), Regional Bell Operating Companies (RBOCs), and third party proprietary databases. Directory assistance listings are normally purchased by the service provider from such data providers. Database 101, according to one embodiment of the present invention, contains basic listing information: name, directory number, and address. To compensate these data providers accurately, it is necessary to keep track of accessed and viewed listings.

The result of the request may be a set of zero or more listings with information that is partially hidden, which in an exemplary embodiment, is the phone (i.e., directory) number. As more fully discussed below with respect to FIGS. 3–5, partially hiding information allows the customer to determine which one of the listings the customer would like to view, and thereby, forces the customer to "select" the desired listing. The hidden information associated with the selected listing is subsequently made visible. This selection is tracked by the system 100. In particular, selecting a listing causes information about the listing to be stored by the service provider for subsequent back-end processing, such as billing, reporting, and compensation to third party data providers.

The directory assistance services of system 100 possess a number of value-added services and capabilities. Unlike conventional directory assistance, system 100 permits the retrieval of information beyond that of name and telephone number. The information, according to one embodiment of the present invention, may be classified as basic content or enhanced content. Databases 101 may store an enhanced listing that includes, for example, email addresses, a mobile number, a voice mail number, a URL, etc., in addition to the basic content of name, directory number, and address. A feature of the directory assistance service of system 100 is the ability to permit the customers, with respect to the enhanced content, to add, delete, or change the information. System 100 also provides sophisticated query capabilities (e.g., similar spellings, sounds like, etc.). Accordingly, system 100 significantly reduces a customer's directory assistance cost over the conventional voice access mechanism by providing a web-based interface to directory information for the users to easily, efficiently, and accurately obtain directory listings.

The on-line directory assistance service can also be supported by a call center (not shown). The call center may provide a web-based text chat capability to answer questions that the customers may have, in addition to communication via telephone in the event that the customer elects to confer with the operator via the phone.

System 100 provides secure access to the directory assistance databases 101 and associated applications. In particular, the system 100 supports authentication and authorization of the directory assistance capabilities; authorization is granular to the level of content within the databases 101 (i.e., varying levels of private data and public data). Commercial customers and third party developers are provided with secured access to the directory assistance data (basic and enhanced content). It is noted that any content that is specific to a customer is only accessible by that customer that owns that data.

Furthermore, system 100 provides a rich set of reporting functionalities. Reports may be prepared for any time period: daily, weekly and monthly. One report may represent the number of page views for each page on the portal or web site. Another report may reveal the number of access to the directory assistance database 101 (transactions) by customer (and third party developers). The system 100 may generate a report that shows the actions that were performed on each page; for example, the total number of click throughs for customer service. Additionally, the reports may be tailored for each customer. As earlier noted, these reports may be generated and displayed through the web browser.

Figure 2:
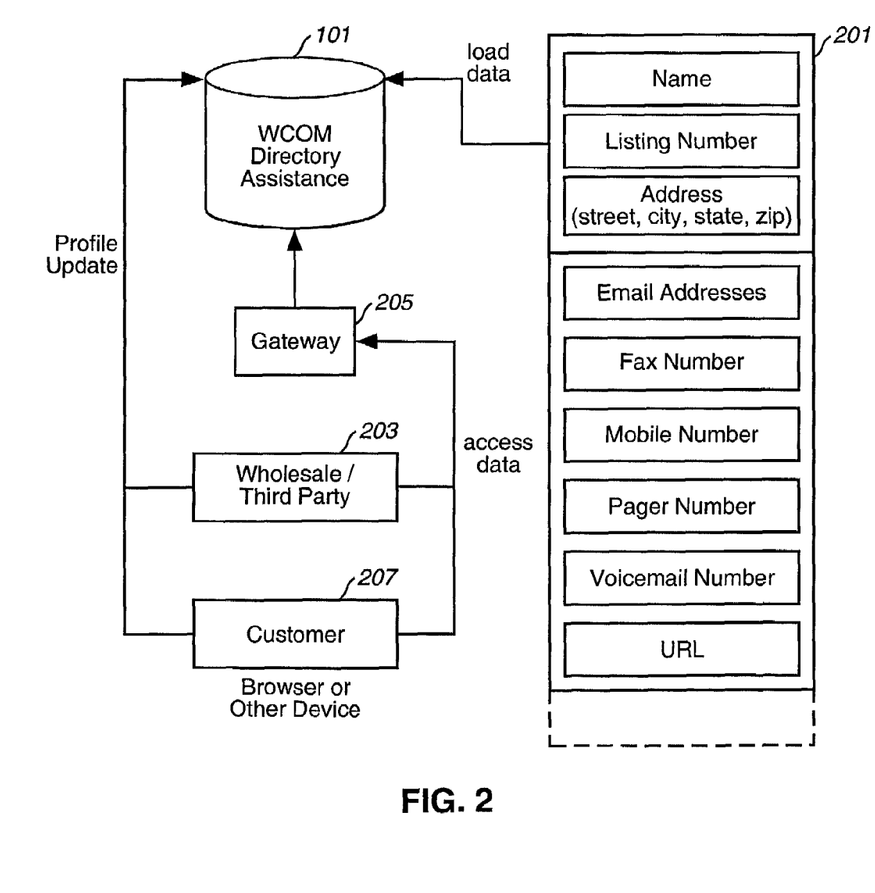
FIG. 2 is a diagram of a database that stores directory assistance information, in accordance with an embodiment of the present invention.

FIG. 2 is a diagram of a database that stores directory assistance information, in accordance with an embodiment of the present invention. As shown in FIG. 2, the directory assistance database 101 may upload the data from a third party data provider 203 via a gateway 205. A customer 207, therefore, is able to access directory information stored within directory assistance database 101 through the use of a browser on a client station 105 (FIG. 1) or some other access device, such as a PDA, web-appliance, an e-mail client, or web-enabled cell phone. Directory assistance database 101 contains multiple directory listings, in which each listing 201 (or directory) may include the following basic fields: a name field, a listing number field, and an address field. The listing number field, in an exemplary embodiment, specifies a land-line telephone number. Database 101 may also store enhanced fields (i.e., enhanced content) that may be tailored to the particular needs of the customers; according to one embodiment of the present invention, these enhanced fields include the following: one or more email address fields, a fax number field, a mobile number field, pager number field, a voicemail number field, and a URL field. According to one embodiment of the present invention, the customer is able to maintain the enhanced content.

Database 101 is extensible to allow for integration or association with enhanced content in other databases (not shown). Further, the directory assistance services afford the customer the functionality to add new content, delete content, or change the enhanced content. The mechanism for modifying the enhanced data (e.g., e-mail addresses, fax number, mobile number, pager number, voicemail number, and URL) includes the web browser 105, as well as other access devices (e.g., PDAs, cellular phones, web appliances, and etc.). The basic content of the directory assistance data is modified by the service provider.

As previously mentioned, the system 100 may be used to manage other types of information with other applications, beyond that of directory assistance data. The system 100, for example, permits commercial customers and third party developers to integrate the directory assistance services into their environment, or have the ability to easily access the directory assistance services data from their intranet. This integration is supported by a Software Development Toolkit (SDK), without requiring extensive systems integration or development effort. Also, commercial customers have the capability to create a link from their intranet into the directory assistance platform.

As stated, system 100 can be adapted to a variety of different applications that are separate or supplemental to the directory assistance services. One application of system 100 is the management of credit cards, whereby the service provider enables the customers to manage a list of credit cards securely. This list of credit cards may be used to notify the corresponding credit card companies in the event that any one of the cards is lost or stolen. The system 100 may also enable users to select a notification method when someone queries their listing. For example, a customer is paged when someone requests the customer's directory assistance listing. Additionally, the database 101 may store demographic information that is tied to the individual listings. Further, the system 100 may provide password authentication and authorization services.

The above directory assistance database 101, in conjunction with the web and application server 131, provides numerous advantages over the conventional on-line directory service systems. Database 101 supports comprehensive content on an individual or business for the customers. The directory service, according to one embodiment of the present invention, maintains high data accuracy, in part, through the continual updating of directory listings, as provided by the third party data providers (e.g., LECs and RBOCs). From the service provider perspective, the implementation of the directory assistance service provides a new revenue source with minimal hardware/software modifications to the existing directory assistance architecture of the voice access system.

Figure 3:
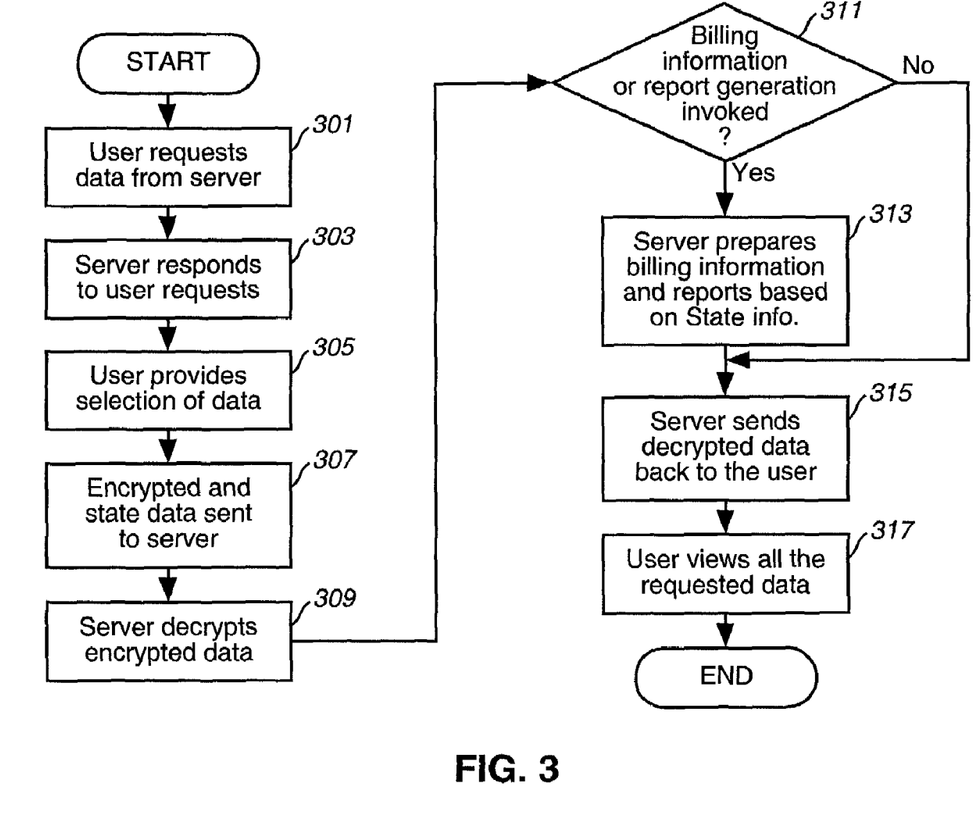
FIG. 3 is a flow chart of a process for retrieving information, in accordance with an embodiment of the present invention.

FIG. 3 is a flow chart of a process for retrieving information, in accordance with an embodiment of the present invention. In general, the concept of information retrieval, according to the present, is to permit the customer to select the desired information based upon viewing a portion of the information. The capability to view the information partially allows the customer to retrieve accurate data that is reflective of the customer's needs, and to pay for only those selected directory listings that are actually used. In this manner, the third party data provider is only compensated for the listings that are retrieved by the customer. In step 301, a user requests information from the web and application server 131 via client browser 105. The web and application server 131 responds to the user request, as in step 303, by generating a response message that contains one or more rows of directory listings. The user may be limited to a predetermined maximum number of records/entries (i.e., rows) that are returned in the results of the online request (i.e., directory assistance query).

Within the response message, there are four types of data, wherein any number of each type of data exists in each row: viewable data, hidden data, encrypted data, and state data. Viewable data is directly viewable by the user through the client browser 105. Hidden data provides a place holder for information that can be displayed; for example, the information is masked by characters that indicate that the true information is not shown, e.g., "XXXXXX". Each block of hidden data has a corresponding encrypted block, which is not directly viewable by the user. Data is encrypted to minimize the possibility that a client may intercept the data to avoid paying for service, for example. Lastly, state data relating to billing and reporting capabilities refer to information that is passed back to the user, and subsequently forwarded to the web and application server 131 upon selection of a row. The data types of viewable data, hidden data, encrypted data, and state data, either individually or in any combination, constitute "state information". According to one embodiment of the present invention, the "state data" data type is employed to expressly represent state information. In another embodiment, the viewable data, hidden data, encrypted data, or any combination thereof, may denote state information. In other words, state information may be represented by any of the above data types. The server 131 need not store any state information regarding the request from the client browser 105 (i.e., server-stateless). The state information may be stored in the client stations that are running the client browsers 105. Unlike the conventional approach, the client browser 105 does not need to return to the particular server 131 for subsequent billing information, as the server 131 is a stateless-server.

In step 305, the user is presented with one or more rows of listings from database 101 correspond to the request and selects the desired listing. The user views the viewable and hidden data and determines which row corresponds to the listing that the user seeks. The method of selection depends on the particular type of user interface being used. The user selects a particular row of information. In the specific case of a web browser as the user interface (as shown below in FIGS. 4 and 5), a combination of viewable and hidden data is sent back to the user as an "anchor" (URL, or link), that can be "clicked".

Thereafter, upon selection of the desired row, the client browser 105 transmits encrypted data and state data to the web and application server 131, per step 307. It should be noted that the selection of listing process is generic and could be used in any system requiring server stateless selection capability. Next, in step 309, the server decrypts the encrypted data. At this point, if the billing and reporting functions are invoked (step 311) by an external process, for example, then the web and application server 131 prepares the billing information and the reports based upon the state data, per step 313. In step 315, the server 131 sends the decrypted data back to the client browser 105. The can now view the entire row of data (step 317). It is this selected row that the customer is charged and upon which the data provider is compensated.

FIG. 4 shows a diagram of a data selection screen of a graphical user interface (GUI) used in the system of FIG. 1, in accordance with an embodiment of the present invention. The client browsers 105 present the user with GUI screens during the retrieval process, as discussed above with respect to FIG. 3. The web and application server 131 instructs the client browser 105 to display a data selection screen 400 in response to the directory assistance query (i.e., request message) by the user. In this example, the user is assumed to request listings for entries for names that include the word "cans." Data selection screen 400, accordingly, presents two rows of listings 401 and 403 in response to the user request message with the term "cans" in the name field.

For the purpose of explanation, screen 400 is described with the basic content of the directory listing; that is, the listings convey the name, address, and directory number. The listings 401 and 403 show the basic content of the directory listings. Alternatively, the data selection screen 400 may supply the enhanced content (e.g., e-mail address, mobile number, fax number, pager number, voicemail number, and URL). Row 401 provides visible data in form of the name, and various portions of the address and telephone number. The "XXXX" characters hide some of the data associated with the telephone number and the ZIP code of the address; the hidden data 405 is not shown until the user selects the particular row 401. The purpose of the partial display of information is to ensure that the user is selecting the correct listing. Similarly, row 403 has hidden data 407. The determination as to what is hidden data can be specified by the service provider; for example, the street number in the address fields 409 and 411 of rows 401 and 403, respectively, may be hidden. Assuming the user is attempting to locate a company that is situated in Iowa. the user is provided with sufficient information to confidently select the proper listing, which in this case is row 401.

FIG. 5 shows a diagram of a data display screen of the graphical user interface (GUI) of FIG. 4, in accordance with an embodiment of the present invention. Continuing with the example of FIG. 4, screen 500 displays the selected row 401. The web and application server 131 forwards new visible data 501 to the client browser 105; the new visible data 501 correspond to the hidden data 405 of FIG. 4.

As evident from the discussion above, the selection process enables the service provider to compensate data providers based on which listings are used. By contrast, the conventional directory system results in the service provider over compensating the data providers, as it is traditionally difficult or not possible to track the listings that are accessed and viewed by the customers.

Figure 6:
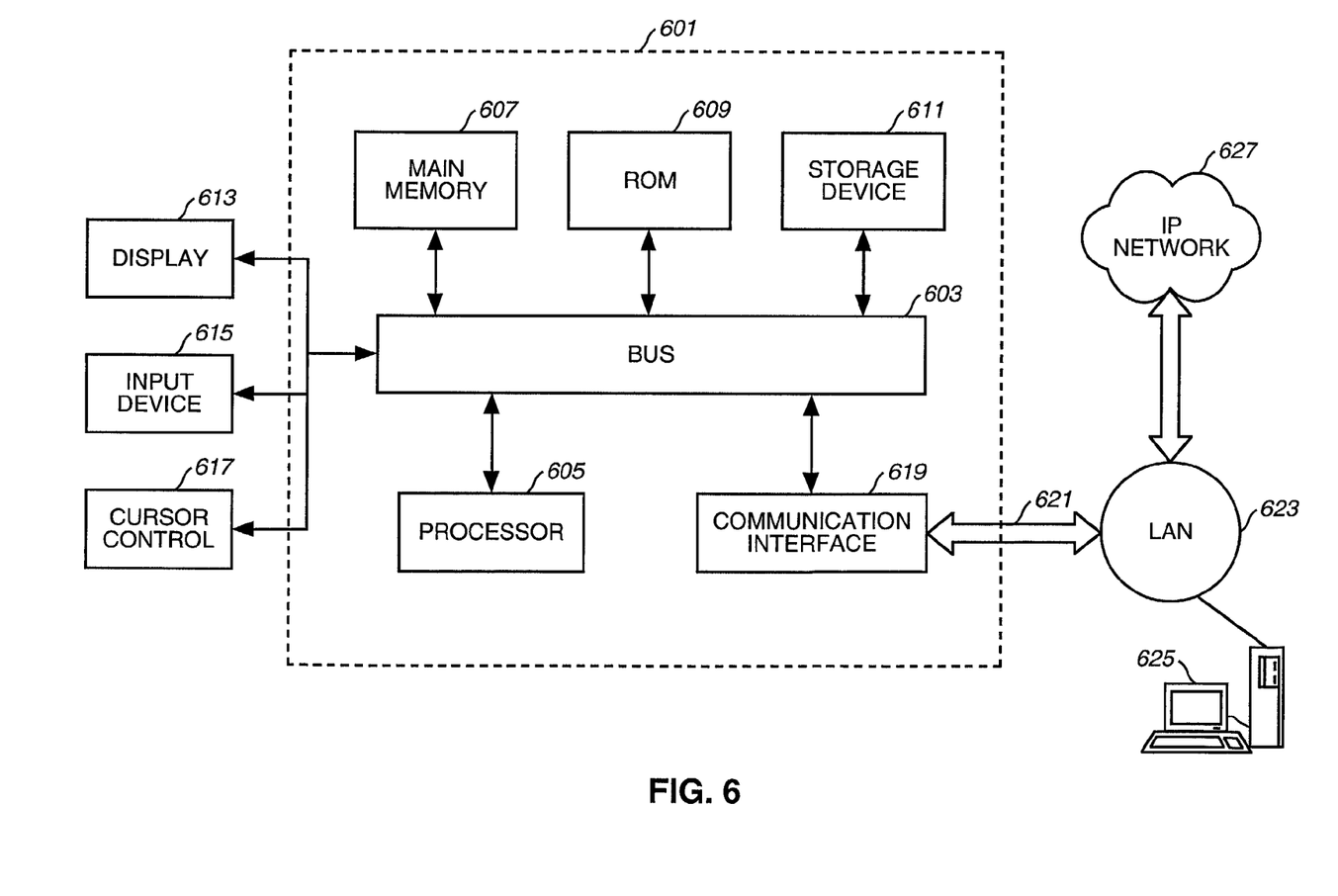
FIG. 6 is a diagram of a computer system that is capable of performing the processes of information retrieval, in accordance with an embodiment of the present invention.

FIG. 6 illustrates a computer system upon which an embodiment according to the present invention may be implemented. Computer system 601 includes a bus 603 or other communication mechanism for communicating information, and a processor 605 coupled with bus 603 for processing the information. Computer system 601 also includes a main memory 607, such as a random access memory (RAM) or other dynamic storage device, coupled to bus 603 for storing information and instructions to be executed by processor 605. In addition, main memory 607 may be used for storing temporary variables or other intermediate information during execution of instructions to be executed by processor 605. Computer system 601 further includes a read only memory (ROM) 609 or other static storage device coupled to bus 603 for storing static information and instructions for processor 605. A storage device 611, such as a magnetic disk or optical disk, is provided and coupled to bus 603 for storing information and instructions.

Computer system 601 may be coupled via bus 603 to a display 613, such as a cathode ray tube (CRT), for displaying information to a computer user. An input device 615, including alphanumeric and other keys, is coupled to bus 603 for communicating information and command selections to processor 605. Another type of user input device is cursor control 617, such as a mouse, a trackball, or cursor direction keys for communicating direction information and command selections to processor 605 and for controlling cursor movement on display 613.

According to one embodiment, the information retrieval process described in FIG. 3 is provided by computer system 601 in response to processor 605 executing one or more sequences of one or more instructions contained in main memory 607. Such instructions may be read into main memory 607 from another computer-readable medium, such as storage device 611. Execution of the sequences of instructions contained in main memory 607 causes processor 605 to perform the process steps described herein. One or more processors in a multi-processing arrangement may also be employed to execute the sequences of instructions contained in main memory 607. In alternative embodiments, hard-wired circuitry may be used in place of or in combination with software instructions. Thus, embodiments are not limited to any specific combination of hardware circuitry and software.

Further, the information retrieval processing instructions of the communication system 100 may reside on a computer-readable medium. The term "computer-readable medium" as used herein refers to any medium that participates in providing instructions to processor 605 for execution. Such a medium may take many forms, including but not limited to, non-volatile media, volatile media, and transmission media. Non-volatile media includes, for example, optical or magnetic disks, such as storage device 611. Volatile media includes dynamic memory, such as main memory 607. Transmission media includes coaxial cables, copper wire and fiber optics, including the wires that comprise bus 603. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 605 for execution. For example, the instructions may initially be carried on a magnetic disk of a remote computer. The remote computer can load the instructions relating to information retrieval remotely into its dynamic memory and send the instructions over a telephone line using a modem. A modem local to computer system 601 can receive the data on the telephone line and use an infrared transmitter to convert the data to an infrared signal. An infrared detector coupled to bus 603 can receive the data carried in the infrared signal and place the data on bus 603. Bus 603 carries the data to main memory 607, from which processor 605 retrieves and executes the instructions. The instructions received by main memory 607 may optionally be stored on storage device 611 either before or after execution by processor 605.

Computer system 601 also includes a communication interface 619 coupled to bus 603. Communication interface 619 provides a two-way data communication coupling to a network link 621 that is connected to a local network 623. For example, communication interface 619 may be a network interface card to attach to any packet switched local area network (LAN). As another example, communication interface 619 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 619 sends and receives electrical, electromagnetic or optical signals that carry digital data streams representing various types of information.

Network link 621 typically provides data communication through one or more networks to other data devices. For example, network link 621 may provide a connection through local network 623 to a host computer 625 or to data equipment operated by a service provider, which provides data communication services through a communication network 627 (e.g., the Internet). LAN 623 and network 627 both use electrical, electromagnetic or optical signals that carry digital data streams. The signals through the various networks and the signals on network link 621 and through communication interface 619, which carry the digital data to and from computer system 601, are exemplary forms of carrier waves transporting the information. Computer system 601 can transmit notifications and receive data, including program code, through the network(s), network link 621 and communication interface 619.

The techniques described herein provide several advantages over prior approaches to providing on-line information retrieval. A user via a user interface transmits an information request to a server, which in turn responds with information in which only a portion of the information is displayed to the user; that is, some of the information is hidden. Upon selecting the particular set of information the user desires, the server forwards the remaining portion of the information. This selection process has particular applicability to directory assistance services, whereby the actual directory listings that are accessed and viewed by the users are tracked. This arrangement advantageously provides the capability to accurately compensate the data providers, resulting in cost savings for the service provider and ultimately the customer.

Obviously, numerous modifications and variations of the present invention are possible in light of the above teachings. It is therefore to be understood that within the scope of the appended claims, the invention may be practiced otherwise than as specifically described herein.

What is claimed is:

1. A method for retrieving information over a packet switched network, the method comprising:
    receiving a request message from a client for information;
    forwarding a portion of the information and state data indicating billing and reporting information associated with the request message to the client in response to the request message;
    receiving a selection message including the state data from the client in response to the forwarded portion specifying whether the remaining portion of the information should be retrieved; and
    forwarding the remaining portion of the information to the client.

2. The method according to claim 1, wherein the step of forwarding the portion comprises:
    generating a response message that includes the portion of the information, the information being partitioned into a plurality of data types, the data types including viewable data, hidden data, encrypted data, and state data.

3. The method according to claim 2, wherein the selection message in the step of receiving the selection message includes encrypted data associated with the information and the state data, the method further comprising:
    decrypting the encrypted data; and
    transmitting new visible data of the information.

4. The method according to claim 2, further comprising:
    preparing billing and reporting information based upon the state data; and
    generating a report based upon the state data.

5. The method according to claim 1, wherein the information is directory assistance information that includes a name field, and a directory number.

6. The method according to claim 1, wherein the step of forwarding the portion is performed using a Hyper Text Transfer Protocol (HTTP), the packet switched network being an Internet Protocol (IP) network.

7. The method according to claim 1, further comprising:
    retrieving the requested information from a database.

8. The method according to claim 6, wherein the step of forwarding the portion provides state information to the client via a Hyper Text Transfer Protocol (HTTP) cookie.

9. A server for providing information over a packet switched network, the server comprising:
    a communication interface configured to receive a request message from a client for information; and
    a processor coupled to the communication interface and configured to retrieve a portion of the information from a database in response to the request message,
    wherein the communication interface receives a selection message including state data indicating billing and reporting information associated with the request message from a client in response to receipt of the retrieved portion, the selection message specifying whether a remaining portion of the information should be retrieved, the remaining portion of the information being forwarded to the client.

10. The server according to claim 9, wherein the processor generates a response message that includes the portion of the information, the information being partitioned into a plurality of data types, the data types including viewable data, hidden data, encrypted data, and state data.

11. The server according to claim 10, wherein the selection message includes encrypted data associated with the information and the state data, the processor decrypting the encrypted data and instructing the transmission of new visible data of the information through the communication interface.

12. The server according to claim 10, wherein billing and reporting information is prepared based upon the state data.

13. The server according to claim 9, wherein the information is directory assistance information that includes a name field, and a directory number.

14. The server according to claim 9, wherein the communication interface is configured to use a Hyper Text Transfer Protocol (HTTP) to communicate with the client, the packet switched network being an Internet Protocol (IP) network.

15. The server according to claim 10, wherein the response message provides state information, wherein the client receives the state information from the server via a Hyper Text Transfer Protocol (HTTP) cookie.

16. A server for providing information over a packet switched network, the server comprising:
   means for receiving a request message from a client for information;
   means for forwarding a portion of the information and state data indicating billing and reporting information associated with the request message to the client in response to the request message;
   means for receiving a selection message including the state data from the client in response to the forwarded portion specifying whether the remaining portion of the information should be retrieved; and
   means for forwarding the remaining portion of the information to the client.

17. The server according to claim 16, wherein the means for forwarding the portion comprises:
   means for generating a response message that includes the portion of the information, the information being partitioned into a plurality of data types, the data types including viewable data, hidden data, encrypted data, and state data.

18. The server according to claim 17, wherein the selection message includes encrypted data associated with the information and the state data, the server further comprising:
   means for decrypting the encrypted data; and
   means for transmitting new visible data of the information.

19. The server according to claim 17, further comprising:
   means for preparing billing information based upon the state data; and
   means for generating a report based upon the state data.

20. The server according to claim 16, wherein the information is directory assistance information that includes a name field, and a directory number.

21. The server according to claim 16, wherein the means for forwarding the portion uses a Hyper Text Transfer Protocol (HTTP), the packet switched network being an Internet Protocol (IP) network.

22. The server according to claim 16, further comprising:
   means for retrieving the requested information from a database.

23. A communication system comprising:
   a client configured to transmit a request message for information over a packet switched network; and
   a server configured to communicate with the client and to forward a portion of the information and state data indicating billing and reporting information associated with the request message to the client in response to the request message, wherein in response to the forwarded portion, the client transmits a selection message specifying whether the remaining portion of the information should be retrieved and the state data to the server, the server forwarding the remaining portion of the information to the client.

24. The system according to claim 23, wherein the server generates a response message that includes the portion of the information, the information being partitioned into a plurality of data types, the data types including viewable data, hidden data, encrypted data, and state data.

25. The system according to claim 24, wherein the selection message includes encrypted data associated with the information and the state data, the server decrypting the encrypted data and transmitting new visible data of the information to the client.

26. The system according to claim 24, wherein the server prepares billing information and a report based upon the state data.

27. The system according to claim 23, wherein the information is directory assistance information that includes a name field, and a directory number.

28. The system according to claim 23, wherein the server uses a Hyper Text Transfer Protocol (HTTP), the packet switched network being an Internet Protocol (IP) network.

29. The system according to claim 23, further comprising:
   a database communicating with the server, the database configured to store the requested information.

30. The system according to claim 23, wherein the selection message provides state information forwarded from the server to the client via a Hyper Text Transfer Protocol (HTTP) cookie, the server maintaining none of the state information.

31. A computer-readable medium carrying one or more sequences of one or more instructions for retrieving information over a packet switched network, the one or more sequences of one or more instructions including instructions which, when executed by one or more processors, cause the one or more processors to perform the steps of:
   receiving a request message from a client for information;
   forwarding a portion of the information and state data indicating billing and reporting information associated with the request message to the client in response to the request message;
   receiving a selection message including the state data from the client in response to the forwarded portion, specifying whether the remaining portion of the information should be retrieved; and
   forwarding the remaining portion of the information to the client.

32. The computer-readable medium according to claim 31, wherein the step of forwarding the portion comprises:
   generating a response message that includes the portion of the information, the information being partitioned into a plurality of data types, the data types including viewable data, hidden data, encrypted data, and state data.

33. The computer-readable medium according to claim 32, wherein the selection message in the step of receiving the selection message includes encrypted data associated with the information and the state data, the one or more processors further performing the steps of:
   decrypting the encrypted data; and
   transmitting new visible data of the information.

34. The computer-readable medium according to claim 32, wherein the one or more processors further perform the steps of:

preparing billing information based upon the state data; and generating a report based upon the state data.

35. The computer-readable medium according to claim 31, wherein the information is directory assistance information that includes a name field, and a directory number.

36. The computer-readable medium according to claim 31, wherein the step of forwarding the portion is performed using a Hyper Text Transfer Protocol (HTTP), the packet switched network being an Internet Protocol (IP) network.

37. The computer-readable medium according to claim 31, wherein the one or more processors further perform the step of:

retrieving the requested information from a database.

38. The computer-readable medium according to claim 31, wherein the selection message provides state information, wherein the step of forwarding the portion forwards the state information to the client via a Hyper Text Transfer Protocol (HTTP) cookie.

* * * * *